United States Patent
Abbas

(10) Patent No.: US 10,650,592 B2
(45) Date of Patent: May 12, 2020

(54) METHODS AND APPARATUS FOR PROVIDING ROTATED SPHERICAL VIEWPOINTS

(71) Applicant: GoPro, Inc., San Mateo, CA (US)

(72) Inventor: Adeel Abbas, Carlsbad, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/234,346

(22) Filed: Dec. 27, 2018

(65) Prior Publication Data

US 2019/0244424 A1 Aug. 8, 2019

Related U.S. Application Data

(63) Continuation of application No. 15/611,465, filed on Jun. 1, 2017, now Pat. No. 10,198,862.

(60) Provisional application No. 62/449,532, filed on Jan. 23, 2017.

(51) Int. Cl.
| | |
|---|---|
| *H04N 7/00* | (2011.01) |
| *G06T 19/00* | (2011.01) |
| *G06T 1/00* | (2006.01) |
| *G06T 3/00* | (2006.01) |

(52) U.S. Cl.
CPC .......... *G06T 19/003* (2013.01); *G06T 1/0007* (2013.01); *G06T 3/0062* (2013.01)

(58) Field of Classification Search
CPC .... G06T 19/003; G06T 3/0062; G06T 1/0007
See application file for complete search history.

(56) References Cited

U.S. PATENT DOCUMENTS

| | | | |
|---|---|---|---|
| 5,649,032 | A | 7/1997 | Burt |
| 6,389,179 | B1 | 5/2002 | Katayama |
| 8,606,073 | B2 | 12/2013 | Woodman |
| 9,171,577 | B1 | 10/2015 | Newman |

(Continued)

FOREIGN PATENT DOCUMENTS

| | | |
|---|---|---|
| CN | 104735464 A | 6/2015 |
| EP | 1162830 A2 | 12/2001 |
| WO | 2013130071 A1 | 9/2013 |

OTHER PUBLICATIONS

Achanta R., et al., 'Slit Superpixeis Gompared to State-of-The-Art Superpixei Methods,' IEEE Transactions on Pattern Analysis and Machine intelligence, 2012, vol. 34 (11), pp. 2274-2282.

(Continued)

*Primary Examiner* — Richard T Torrente
(74) *Attorney, Agent, or Firm* — Gazdzinski & Associates, PC

(57) ABSTRACT

Apparatus and methods for providing a rotated spherical viewpoint (RSV). In one or more embodiments, the RSV is implemented using equirectangular projections (ERPs). The RSV methodologies described herein are particularly suitable for panning within virtual reality (VR) or 360° panoramic content as there is minimal, if any, geometric distortions at the edge of a given viewport. Moreover, the RSV methodologies described herein may reduce the bandwidth requirements of, for example, devices operating in a client-server architecture. Additionally, the computation requirements for providing RSV are minimal and can be provided using relatively simple rotation transforms.

17 Claims, 7 Drawing Sheets

(56) References Cited

U.S. PATENT DOCUMENTS

| | | |
|---|---|---|
| 9,277,122 B1 | 3/2016 | Imura |
| 9,355,433 B1 | 5/2016 | Adsumilli |
| 9,369,689 B1 | 6/2016 | Tran |
| 9,478,054 B1 | 10/2016 | Lewis |
| 9,547,883 B1 | 1/2017 | Stepanenko |
| 9,575,803 B2 | 2/2017 | Chauvet |
| 9,681,111 B1 | 6/2017 | Newman |
| 2001/0047517 A1 | 11/2001 | Christopoulos |
| 2003/0007567 A1 | 1/2003 | Newman |
| 2003/0035047 A1 | 2/2003 | Katayama |
| 2003/0234866 A1 | 12/2003 | Cutler |
| 2005/0226483 A1 | 10/2005 | Geiger |
| 2006/0159352 A1 | 7/2006 | Ishtiaq |
| 2006/0188014 A1 | 8/2006 | Civanlar |
| 2006/0256397 A1 | 11/2006 | Cui |
| 2006/0268131 A1 | 11/2006 | Cutler |
| 2007/0025723 A1 | 2/2007 | Baudisch |
| 2007/0064800 A1 | 3/2007 | Ha |
| 2007/0237420 A1 | 10/2007 | Steedly |
| 2008/0304567 A1 | 12/2008 | Boyce |
| 2009/0180552 A1 | 7/2009 | Visharam |
| 2010/0002070 A1* | 1/2010 | Ahiska ............ G08B 13/19691 348/36 |
| 2010/0002071 A1 | 1/2010 | Ahiska |
| 2010/0014780 A1 | 1/2010 | Kalayeh |
| 2010/0054628 A1 | 3/2010 | Levy |
| 2010/0158134 A1 | 6/2010 | Yin |
| 2012/0092453 A1 | 4/2012 | Sun |
| 2012/0242788 A1 | 9/2012 | Chuang |
| 2012/0307000 A1 | 12/2012 | Doepke |
| 2014/0152863 A1 | 6/2014 | Drouot |
| 2014/0218354 A1 | 8/2014 | Park |
| 2014/0258552 A1 | 9/2014 | Oyman |
| 2014/0314336 A1* | 10/2014 | Yagi ..................... H04N 1/3878 382/282 |
| 2015/0065803 A1 | 3/2015 | Douglas |
| 2015/0109468 A1 | 4/2015 | Laroia |
| 2015/0124877 A1 | 5/2015 | Choi |
| 2015/0138311 A1 | 5/2015 | Towndrow |
| 2015/0249813 A1 | 9/2015 | Cole |
| 2015/0296231 A1 | 10/2015 | Kwon |
| 2015/0341552 A1 | 11/2015 | Chen |
| 2015/0341557 A1 | 11/2015 | Chapdelaine-Couture |
| 2015/0346832 A1 | 12/2015 | Cole |
| 2016/0012855 A1 | 1/2016 | Krishnan |
| 2016/0014422 A1 | 1/2016 | Su |
| 2016/0050423 A1 | 2/2016 | Alshina |
| 2016/0065947 A1 | 3/2016 | Cole |
| 2016/0142697 A1 | 5/2016 | Budagavi |
| 2016/0241892 A1 | 8/2016 | Cole |
| 2016/0253795 A1 | 9/2016 | Cole |
| 2016/0274338 A1 | 9/2016 | Davies |
| 2016/0295128 A1 | 10/2016 | Schnittman |
| 2018/0204311 A1* | 7/2018 | Kishine ................... G06T 3/005 |

OTHER PUBLICATIONS

Allene C, et al,, 'Seamless Image-based Texture Atlases Using Multi-band Blending,' Pattern Recognition, 2008. ICPR 2008. 19th International Conference on, 2008. 4 pages.

Badrinarayanan V., et al., 'Segnet: a Deep Convoiutional Encoder-Decoder Architecture for Image Segmentation,' arXiv preprint arXiv: 1511.00561, 2015. 14 pages.

Barghout L. and Sheynin J., 'Real-world scene perception and perceptual organization: Lessons from Computer Vision'. Journal of Vision, 2013, vol. 13 (9). (Abstract). 1 page.

Barghout L., 'Visual Taxometric approach Image Segmentation using Fuzzy-Spatial Taxon Cut Yields Contextually Relevant Regions,' Communications in Computer and Information Science (CCIS), Springer-Verlag, 2014, pp. 163-173.

Bay H., et a!., 'Surf: Speeded up Robust Features,' European Conference on Computer Vision, Springer Berlin Heidelberg, 2006, pp. 404-417.

Beier et al., 'Feature-Based Image Metamorphosis,' in Computer Graphics Journal, Jul. 1992, vol. 28 (2), pp. 35-42.

Brainard R.C., et al., "Low-Resolution TV: Subjective Effects of Frame Repetition and Picture Replenishment," Bell Labs Technical Journal, Jan. 1967, vol. 46 (1), pp. 261-271.

Burt et al., 'A Multiresolution Spline with Application to Image Mosaics,' in ACM Transactions on Graphics (TOG), 1983, vol. 2, No. 4, pp. 217-236.

Chan et al., 'Active contours without edges'. IEEE Transactions on Image Processing, 2001, 10 (2), pp. 266-277 (hereinafter 'Chan').

Chang H., etal., 'Super-resolution Through Neighbor Embedding,' Computer Vision and Pattern Recognition, 2004. CVPR2004. Proceedings of the 2004 IEEE Computer Society Conference on, vol. 1, 2004. 8 pages.

Elen, 'Whatever happened to Ambisonics' AudioMedia Magazine, Nov. 1991. 18 pages.

Gracias, et al., 'Fast Image Blending Using Watersheds and Graph Cuts,' Image and Vision Computing, 2009, vol. 27 (5), pp. 597-607.

Grois D., et al., 'Complexity-Aware Adaptive Spatial Pre-Processing for ROI Scalable Video Coding With Dynamic Transition Region', Image Processing (ICIP), 2011 18th IEEE International Conference on, IEEE, Sep. 11, 2011, pp. 741-744, XP032080597, DOI: 10.1109/ICIP.2011.6116661, ISBN: 978-1-4577-1304-0.

Grois, et al., "Efficient Adaptive Bit-Rate Control for ROI Scalable Video Coding", Workshop on Picture Coding and Image Processing 2010; Jul. 12, 2010-Jul. 12-2010; Nagoya, Dec. 7, 2010 (Dec. 7, 2010), XP030082089, 2 pages.

Grois, et al., 'Recent Advances in Region-of-Interest Video Coding' in: 'Recent Advances on Video Coding', Jul. 5, 2011 (Jul. 5, 2011), InTech, XP055257835, ISBN: 978-953-30-7181-7 DOI: 10.5772/17789, 29 pages.

H.264 (Oct. 2012) and/or ISO/IEC 14496-10:2012, Information technology—Coding of audio-visual objects—Part 10: Advanced Video Coding, 402 pages.

High Efficiency Video Coding (HEVC), also known as H.265 (described in e.g., ITU-T Study Group 16—Video Coding Experts Group (VCEG)—ITU-T H.265, and/or ISO/IEC JTC 1/SC 29/WG 11 Motion Picture Experts Group (MPEG)—the HEVC standard ISO/IEC 23008-2:2015, 657 pages.

Herbst E., et al., 'Occlusion Reasoning for Temporal Interpolation Using Optical Flow,' Department of Computer Science and Engineering, University of Washington, Tech. Rep. UW-CSE-09-08-01,2009. 41 pages.

Ichimura D., et al., 'Slice Group Map for Mult. Interactive ROI Seal', 17. JVT Meeting; 74. MPEG Meeting; Oct. 14, 2005-Oct. 21, 2005; Nice, FR;(Joint Video Team of ISO/IEC JTC1/SC29/WG11 and ITU-T SG.16), No. JVT-Q020r1, Oct. 14, 2005 (Oct. 14, 2005), XP030006183, ISSN: 0000-0413. 20 pages.

Jakubowski M., et aL, 'Block-based motion estimation algorithmsa survey,' Opto-Eiectronics Review 21, No. 1 (2013), pp. 88-102.

Kendall A., et al., 'Bayesian Segnet: Model Uncertainty in Deep Convolutional Encoder-Decoder Architectures for Scene Understanding,' arXiv: 1511.02680, 2015. (11 pages).

Lowe D.G., 'Object Recognition From Local Scale-invariant Features,' Computer vision, The proceedings of the seventh IEEE international conference on 1999, vol. 2, pp. 1150-1157.

Mitzel D., et al., 'Video Super Resolution Using Duality Based TV-I1 Optical Flow,' Joint Pattern Recognition Symposium, 2009, pp. 432-441.

Perez et al., 'Poisson Image Editing,' in ACM Transactions on Graphics (TOG), 2003, vol. 22, No. 3, pp. 313-318.

Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.

Schwartz, E., et al., "Implementation of Compression with Reversible Embedded Wavelets," in Proc. SPIE, 1995, 12 pages.

Suzuki et al., 'Inter Frame Coding with Template Matching Averaging,' in IEEE international Conference on Image Processing Proceedings (2007), Vol (iII), pp. 409-412.

Szeliski R., "Computer Vision: Algorithms and Applications," Springer Science & Business Media, 2010, 979 pages.

(56) References Cited

OTHER PUBLICATIONS

Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.

Ugur. et al.,"MV-HEVC/SHVC HLS: On default Output Layer Sets", Jan. 2014. 4 pages.

Vass, J., et al., 'Efficient Three-Dimensional Wavelet Codecs for Networked Video Communication,' in Proceedings of IEEE International Conference on Image Processing, Kobe, Japan, Oct. 1999, pp. 565-569.

Won, et al., 'Size-Controllable Region-of-Interest in Scalable Image Representation', IEEE Transactions on Image Processing, IEEE Service Center, Piscataway, NJ, US, vol. 20, No. 5, May 1, 2011 (May 1, 2011 ), pp. 1273-1280, XPO 11411787, ISSN: 1057-7149, DOI: 10.1109/TIP.2010.2090534.

Xiao, et al., 'Multiple View Semantic Segmentation for Street View Images,' 2009 IEEE 12th International Conference on Computer Vision, 2009, pp. 686-693.

Xiong Y et ai 'Gradient Domain Image Blending and Implementation on Mobile Devices,' International Conference on Mobile Computing, Applications, and Services, Springer Berlin Heidelberg, 2009, pp. 293-306.

Zhai et al., "A Low Complexity Motion Compensated Frame Interpolation Method," in IEEE International Symposium on Circuits and Systems (2005), pp. 4927-4930.

Zhang., "A Flexible New Technique for Camera Calibration" IEEE Transactions, dated Nov. 2000, vol. 22, No. 11, pp. 1330-1334.

\* cited by examiner

METHODS AND APPARATUS FOR PROVIDING ROTATED SPHERICAL VIEWPOINTS

PRIORITY

This application is a continuation and claims the benefit of priority to U.S. patent application Ser. No. 15/611,465 filed Jun. 1, 2017 of the same title, which claims the benefit of priority to U.S. Provisional Patent Application Ser. No. 62/449,532 filed Jan. 23, 2017 of the same title, each of which is incorporated herein by reference in its entirety.

RELATED APPLICATIONS

This application is related to U.S. Provisional Patent Application Ser. No. 62/446,297 filed Jan. 13, 2017 and entitled "Methods and Apparatus for Rotated Sphere Projections", which is incorporated herein by reference in its entirety.

This application is also related to U.S. patent application Ser. No. 15/289,851 filed Oct. 10, 2016 and entitled "Apparatus and Methods for the Optimal Stitch Zone Calculation of a Generated Projection of a Spherical Image", which is incorporated herein by reference in its entirety.

This application is also related to U.S. patent application Ser. No. 15/234,869 filed Aug. 11, 2016 and entitled "Equatorial Stitching of Hemispherical Images in a Spherical Image Capture System", which claims the benefit of priority to U.S. Provisional Patent Application Ser. No. 62/204,290 filed on Aug. 12, 2015 and entitled "Equatorial Stitching of Hemispherical Images in a Spherical Capture System", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to video image processing and in one exemplary aspect, to methods and apparatus for the provision of rotated spherical viewports for omnidirectional videos and images.

Description of Related Art

In a so-called spherical projection, a viewing device simulates a viewing experience from within a virtualized sphere; e.g., an image is projected onto the virtual spherical surface and viewed from inside the sphere. Spherical images are typically obtained by capturing multiple images with overlapping fields of view from different cameras and combining ("stitching") these images together. However, most viewing devices can only display a two-dimensional image. Additionally, converting a spherical projection to a two-dimensional projection format can introduce some amount of distortion and/or affect the subsequent image data. However, two-dimensional projections are desirable for compatibility with existing image processing techniques and also for most user applications. In particular, many encoders and compression techniques assume traditional rectangular image formats. Thus, projections that use so-called "fish-eye" projections are not suitable for most encoders. Similarly, some projections may drastically warp object continuity at particular regions or along certain "lines" within the image.

Virtual reality (VR) or other panoramic 360° images and video often require the rendering/display device to extract a sub-region portion of the source video/image data (a so-called "viewport") for rendering/display purposes. One of the most common methodologies to extract a given viewport from, for example, omnidirectional video involves projecting the video data into a rectilinear projection (which is a two-dimensional projection). The conversion of omnidirectional images onto a rectilinear projection "flattens" the projection, similar to the manner in which a globe of the world is flattened when it is represented with a two-dimensional map. Rectilinear projections work well for smaller field of view (FOV) viewports (e.g., 60°×60°), but as soon as the FOV of the viewport starts to increase (e.g., 75°×75°), the corners of the viewport experience "stretching". This pattern is exacerbated further for larger FOVs (e.g., 90°×90°). At these larger FOVs, the corners of the viewport appear extremely stretched and are aesthetically displeasing/unwatchable for a user. This is due to the geometric distortions introduced from projecting spherical data rectilinearly. For these types of projections, the point on the image that does not experience any or only minimal distortion is located at the center of the image. As points move closer to the edge (i.e., top/bottom/left/right), the stretching increases significantly.

FIG. 1 illustrates an exemplary prior art rectilinear projection (at a 75°×75° viewport) which illustrates the extreme distortions located at the corners of the image (e.g., the face in the image appears quite distorted). In FIG. 2 (prior art), the face appears with minimal distortion; however, the objects towards the edge of the image (e.g., the left-most car) appear distorted. Accordingly, prior methods for displaying VR and/or 360° panoramic content are limited as: (1) wider FOV viewports are not aesthetically pleasing (although wider FOV viewports may ostensibly give a better sense of immersion); and (2) viewport distortions may give an unnatural experience as the user dynamically moves a viewport. For example, the object may appear fine when placed in the middle of the viewport, but may be "stretched" when panning, for example, to the corner of the image. These distortions will dynamically stretch and warp the image when a user moves or "pans" the viewport.

SUMMARY

The present disclosure satisfies the foregoing needs by providing, inter alia, methods and apparatus for providing and receiving rotated sphere viewpoints (RSVs).

In a first aspect, a method for generated a rotated sphere viewpoint (RSV) is disclosed. In one embodiment, the method includes retrieving first image data associated with a first portion of interest within source image data; providing the first image data to a network interface; receiving a request for second image data associated with a second portion of interest that is offset from the first portion of interest within the source image data; transforming the first image data in response to the received request for the second image data such that the transformed first image data is associated with the second portion of interest within the source image data; processing the transformed first image data into resultant image data; and providing the resultant image data to the network interface.

In a variant, the source image data includes spherical image data and the transforming of the first image data corresponds to rotating the source image data.

In another variant, the rotating of the source image data comprises rotating along a latitudinal dimension of the spherical image data.

In yet another variant, the rotating of the source image data comprises rotating along a longitudinal dimension of the spherical image data.

In yet another variant, the transformed first image data comprises spherical image data and the processing of the transformed first image data comprises projecting the spherical image data to an equirectangular projection (ERP).

In yet another variant, the method further includes storing a plurality of versions of the first image data, each of the plurality of versions of the first image data collectively comprising a plurality of transformed versions of the first image data at a plurality of fixed latitudinal offsets.

In yet another variant, the providing of the resultant image data to the network interface further includes retrieving one or more of the stored plurality of versions of the first image data.

In yet another variant, the stored plurality of versions of the first image data includes storing a first viewport at a first longitudinal offset and storing a second viewport at a second longitudinal offset, the second longitudinal offset differing from the first longitudinal offset.

In yet another variant, the stored plurality of versions of the first image data comprises transforming the source image data into an equirectangular projection (ERP) of a 360° panorama.

In a second aspect, an apparatus configured to generate a rotated sphere viewpoint (RSV) is disclosed. In one embodiment, the apparatus includes a network interface configured to communicate with a display device; a processor apparatus; and a non-transitory computer readable storage apparatus including instructions, which when executed by the processor apparatus, cause the processor apparatus to: retrieve first image data associated with a first portion of interest within source image data; provide the first image data to the network interface; receive a request for second image data associated with a second portion of interest that is offset from the first portion of interest within the source image data; transform the first image data in response to the received request for the second image data such that the transformed first image data is associated with the second portion of interest within the source image data; process the transformed first image data into resultant image data; and provide the resultant image data to the network interface.

In one variant, the source image data includes spherical image data and the transformed first image data corresponds to a rotated version of the spherical image data.

In another variant, the rotated version of the spherical image data is pre-stored prior to being requested by a user.

In yet another variant, the rotated version of the spherical image data is generated from an extant graphics processing unit (GPU).

In yet another variant, the processed transformed first image data includes an equirectangular projection (ERP).

In yet another variant, the apparatus includes a camera system.

In a third aspect, an apparatus configured to receive a rotated sphere viewpoint (RSV) is disclosed. In one embodiment, the apparatus includes a network interface configured to communicate with a generating device; a visual display; a processor apparatus; and a non-transitory computer readable storage apparatus including instructions, which when executed by the processor apparatus, cause the processor apparatus to: receive first image data via the network interface from the generating device, wherein the first image data has a viewport of interest; display the received first image data via the visual display; and responsive to a desired viewpoint being outside a given range of the viewport of interest, transmit a request for second image data that is offset from the first image data; and receive the second image data via the network interface from the generating device, the second image data having the desired viewpoint that is offset from the viewport of interest of the first image data.

In one variant, the instructions, which when executed by the processor apparatus, cause the processor apparatus to: responsive to the desired viewpoint being within the given range of the viewport of interest, continue to receive the first image data.

In another variant, the desired viewpoint being outside the range of interest comprises a detection of a latitudinal offset of greater than a prescribed threshold value.

In yet another variant, the given range corresponds to a given meridian range.

In yet another variant, the desired viewpoint being outside the range of interest comprises a detection of a longitudinal offset that is larger than the given meridian range.

In yet another variant, the request for second image data that is offset from the first image data comprises receipt of the second image having a fixed offset from the first image data.

In yet another variant, the apparatus includes a camera system.

In a fourth aspect, a non-transitory computer readable storage apparatus is disclosed. In one embodiment, the non-transitory computer readable storage apparatus includes instructions, which when executed by a processor apparatus, cause the processor apparatus to: retrieve first image data associated with a first portion of interest within source image data; provide the first image data to the network interface; receive a request for second image data associated with a second portion of interest that is offset from the first portion of interest within the source image data; transform the first image data in response to the received request for the second image data such that the transformed first image data is associated with the second portion of interest within the source image data; process the transformed first image data into resultant image data; and provide the resultant image data to the network interface.

In a second embodiment, the non-transitory computer readable storage apparatus includes instructions, which when executed by a processor apparatus, cause the processor apparatus to: receive first image data via the network interface from the generating device, wherein the first image data has a viewport of interest; display the received first image data via the visual display; and responsive to a desired viewpoint being outside a given range of the viewport of interest, transmit a request for second image data that is offset from the first image data; and receive the second image data via the network interface from the generating device, the second image data having the desired viewpoint that is offset from the viewport of interest of the first image data.

In a fifth aspect, a hardware apparatus is disclosed. In one embodiment, the hardware apparatus contains computerized logic that is configured to: retrieve first image data associated with a first portion of interest within source image data; provide the first image data to a network interface; receive a request for second image data associated with a second portion of interest that is offset from the first portion of interest within the source image data; transform the first image data in response to the received request for the second image data such that the transformed first image data is associated with the second portion of interest within the source image data; process the transformed first image data into resultant image data; and providing the resultant image data to the network interface.

Other features and advantages of the present disclosure will immediately be recognized by persons of ordinary skill in the art with reference to the attached drawings and detailed description of exemplary implementations as given below.

All Figures disclosed herein are © Copyright 2017 GoPro, Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Moreover, while implementations described herein are primarily discussed in the context of spherical images that are captured, e.g., using a spherical camera system having two (2) or more cameras (e.g., a front-facing and a rear-facing camera), it is readily appreciated that the principles described herein can be equally applied to other image formats.

These and other variations would be readily apparent to one of ordinary skill given the contents of the present disclosure.

Exemplary Rotated Spherical Viewports—

The methodologies described herein "rotate" the spherical image within, for example, an equirectangular projection (ERP) such that the area of interest (where the viewport is being extracted from) is rotated to the area of minimum geometric distortion. Generally speaking, the area of minimum geometric distortion will occur in areas where the projection "touches" the virtual sphere that is representative of the spherically projected VR and/or panoramic 360° content. While the following discussion is discussed primarily in terms of ERP, it is readily appreciated that the principles described herein may be applied to other forms of projections including, without limitation, rotated spherical projection (RSP), cubemap, equal-area, octahedron, icosahedron, truncated square pyramid, and segmented sphere projections. The collective methodologies described herein will be referred to as RSV, which may refer to methodologies that use ERPs, or may use other types of projections such as, e.g., RSP.

Figure 3:
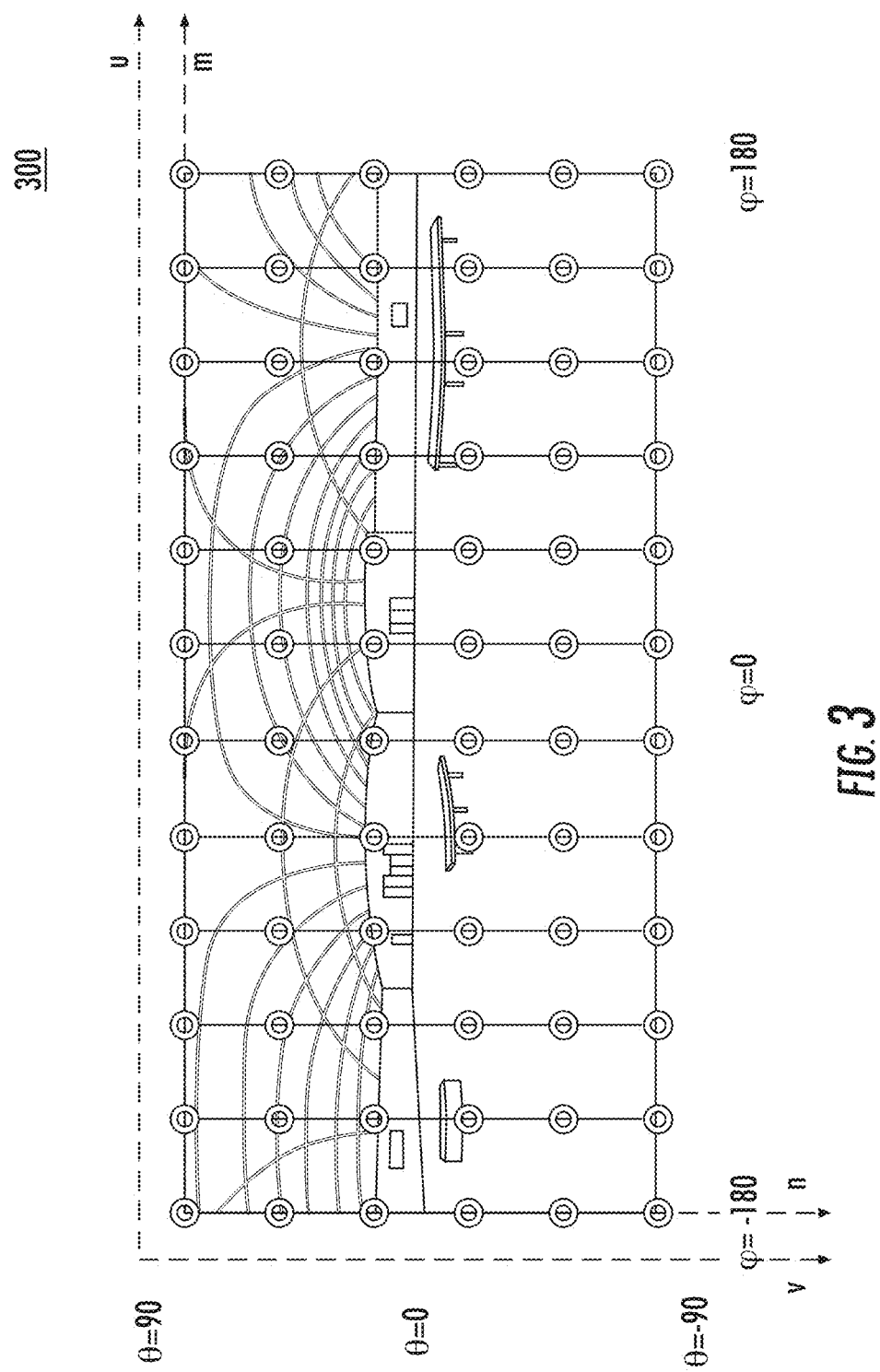
FIG. 3 is a sample image illustrating a sampling coordinate definition in accordance with a rotated spherical viewpoint (RSV) in accordance with the principles of the present disclosure.

Referring now to FIG. 3, an example ERP projection 300 of a spherical source image is shown. As shown, the three dimensional (3D) spherical coordinates (i.e., latitude ($\theta$) and longitude ($\phi$)) space are mapped to the ERP two-dimensional surface. Specifically, the original spherical projection's longitude is represented by $\phi$ (which runs along the horizontal axis of the ERP projection) and the latitude is represented by $\theta$ (which runs along the vertical axis of the ERP projections). Artisans of ordinary skill in the related arts appreciate that the spherical coordinates could also be described in terms of Cartesian coordinates (X, Y and Z) or other coordinate systems, the foregoing being purely illustrative.

Figure 4A:
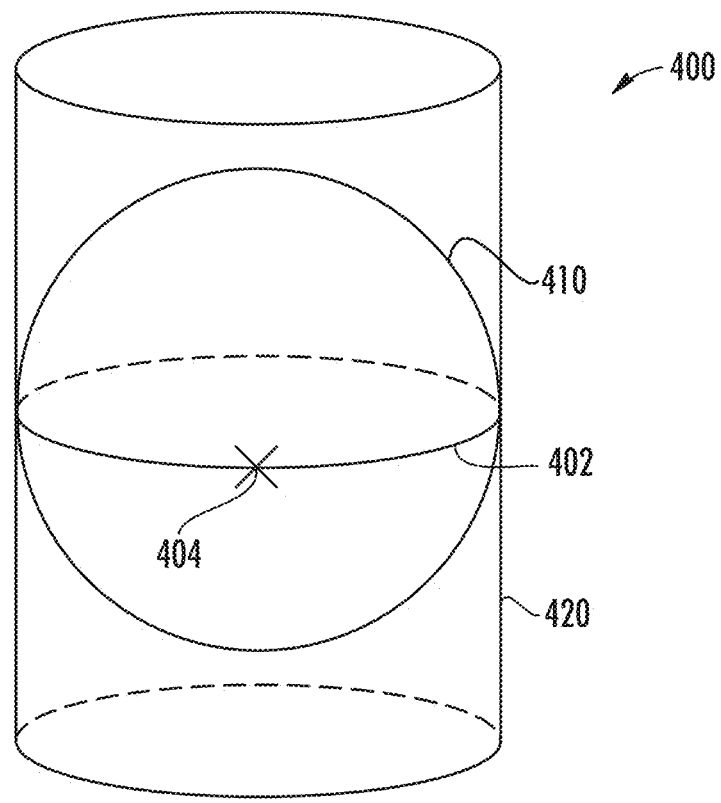
FIG. 4A is a graphical representation of an equirectangular projection (ERP) where a point of interest lies on the equator of a spherical image, in accordance with various aspects of the present disclosure.

Consider FIG. 4A, which depicts a spherical representation of an image denoted by virtual sphere 410 (the spherical image would be viewed from the inside of the virtual sphere). The ERP, depicted as virtual cylinder 420, is "laid over" the sphere 410 such that the equator 402 of the virtual sphere is collinear with the surface of the virtual cylinder 420. Accordingly, where the point of interest 404 lies on the equator, this point of interest will be displayed in a viewport with minimal distortion. The ERP is generated by projecting the sphere image data onto the surface of the cylinder 420. Thereafter, the cylinder 420 can be "unwrapped" as a two-dimensional rectangle such as was described in FIG. 3, supra.

In one exemplary embodiment of the present disclosure, the coordinates on the sphere can be rotated and/or translated in any particular orientation within 3D space as a mathematical transform and re-projected. For example, a rotation may be performed by linearly mapping between a first vector space and a second vector space where the first and second vector space are offset in angle(s) $\theta$ and/or $\phi$. For example, referring now to FIG. 4B, the same spherical representation of an image is denoted by sphere 410. However, in FIG. 4B, the point of interest 406 is a point that no longer resides along the equator 402. Accordingly, a new virtual cylinder 430 is generated in which the points of the virtual cylinder 430 run along an offset equator 440 (having point of interest 406) such that the point of interest 406 may be viewed in viewport with minimal distortion.

Figure 4B:
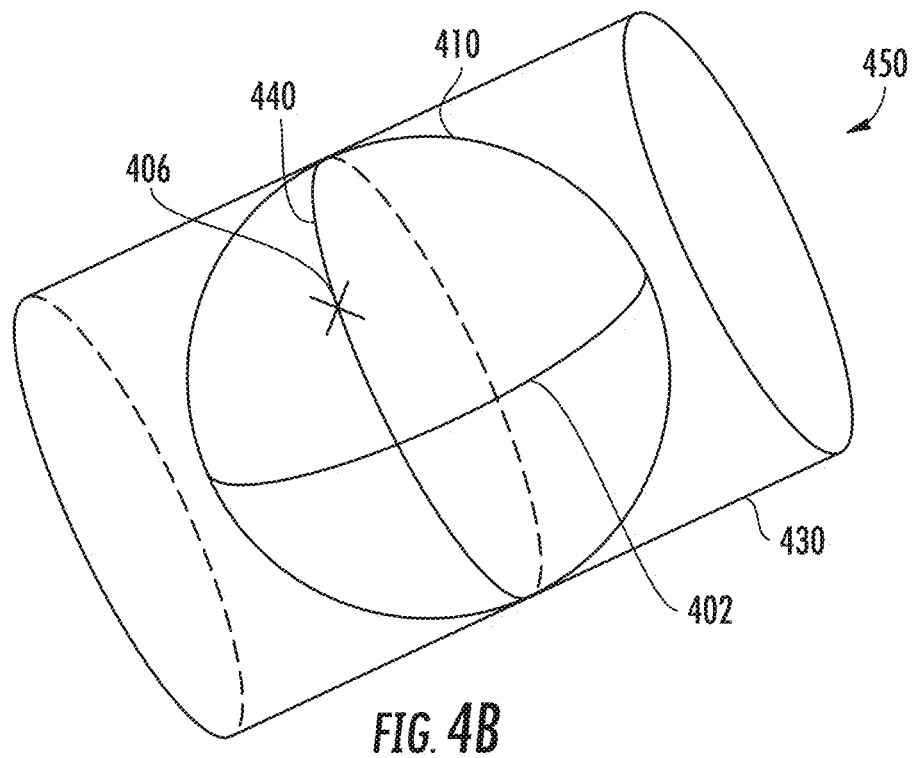
FIG. 4B is a graphical representation of the ERP of FIG. 4A in which a point of interest lies off of the equator of a spherical image, in accordance with various aspects of the present disclosure.

As shown in FIGS. 4A and 4B, the points that lie on the zero latitude equator experience no geometric distortion because, the ERP "touches" the sphere (i.e., runs closest to the sphere). Thus, various exemplary embodiments of the present disclosure are directed to rotating the spherical image in a three-dimensional (3D) coordinate system, to place the desired viewport such that the "equator" line is kept in the middle of the viewport. In this manner, the viewport projects the pixels that correspond to the desired viewport with a minimal amount of distortion.

In some variants, various rotated ERP projections of the image may be stored for later retrieval by users during content viewing/playback. For example, various viewports may be stored for points of interest at longitudinal angular offsets along the equator (e.g., latitude (θ)=0°). One viewport ("First Viewport") may be stored between longitude (φ) −180° and −60°, another viewport ("Second Viewport") may be stored between longitude (φ) −60° and 60°, and a third viewport ("Third Viewport") may be stored between longitude (φ) 60° and 180°. By pre-storing the First Viewport, Second Viewport, and Third Viewport, a device can quickly transition to a different viewport with minimal processing effort; this may be particularly useful for playback on viewers that have limited processing power or responsiveness. Moreover, the foregoing angular offsets are purely illustrative of the broader concept of pre-stored angularly offset viewpoints. A greater or fewer number of pre-stored angularly offset viewports may be substituted by one of ordinary skill in the related arts with equivalent success, given the contents of the present disclosure.

In some such variants, the aforementioned longitudinal offset First Viewport, Second Viewport, and Third Viewport, may additionally have multiple latitudinal angular offsets. For example, the First Viewport may have a point of interest at a latitudinal offset of (θ)=30° at the longitude (φ) of 0° (i.e., tilted upwards), and a point of interest at a latitudinal offset of (θ)=−30° at the longitude (φ)) of 0° (i.e., tilted downwards). In order to quickly provide these tilted viewports, each of the viewports may be pre-generated and stored in addition to the non-tilted version. In other words, the same spherical source image will have three (3) viewports for longitude 0°: a latitudinal offset of −30° (downward tilted), +30° (upward tilted), and 0° (no tilt).

More generally, artisans of ordinary skill in the related arts, given the contents of the present disclosure, will recognize that this technique need not be limited to viewports. In fact, some variants may pre-store entire 360° panoramic ERPs (or portions thereof) at different angular offsets to reduce processing burden or computational complexity. For example, various latitude and/or longitude offset ERPs of the sphere can be stored. It is of particular note that such ERPs may be redundant with one another. For example, consider a tilted equator that runs above the original equator by a latitude (θ) of 30° at a longitude (φ) of 0° (the front view), dips below the original equator, and runs through a latitude (θ) of −30° at a longitude (φ) of 180° (the rear view) and has a latitude (θ) of 0° at a longitude of 90° and −90° (the side views). Such an ERP is tilted up for the front view, but is also tilted down for the rear view. This property may be used to reduce the memory footprint of pre-stored ERPs and/or viewports. For example, a first 360° panoramic ERP at a latitude (φ) of 30° at a longitude of 90° redundantly matches a second 360° panoramic ERP at a latitude (θ) of −30° at a longitude of −90°. Thus, a single pre-stored ERP can be used to represent both.

Various applications may have different requirements for processing power, memory, power consumption, and/or network bandwidth. For example, desktop based solutions may de-prioritize memory over other considerations (e.g., memory is inexpensive, whereas image processing can be processor intensive). In contrast, streaming applications are bandwidth sensitive, and thus may be very sensitive to memory payload sizes. Similarly, mobile applications may have limitations with regard to power consumption, memory, and/or processor limitations. As such, redundant information may not need to be re-provided in certain instances. These and other viewport storage configurations may take into consideration redundant information when providing this information from, for example, a server residing on a network to, for example, a display device (e.g., a laptop, a tablet, a mobile device (e.g., smartphones) and/or other computing/display devices).

Figure 1:
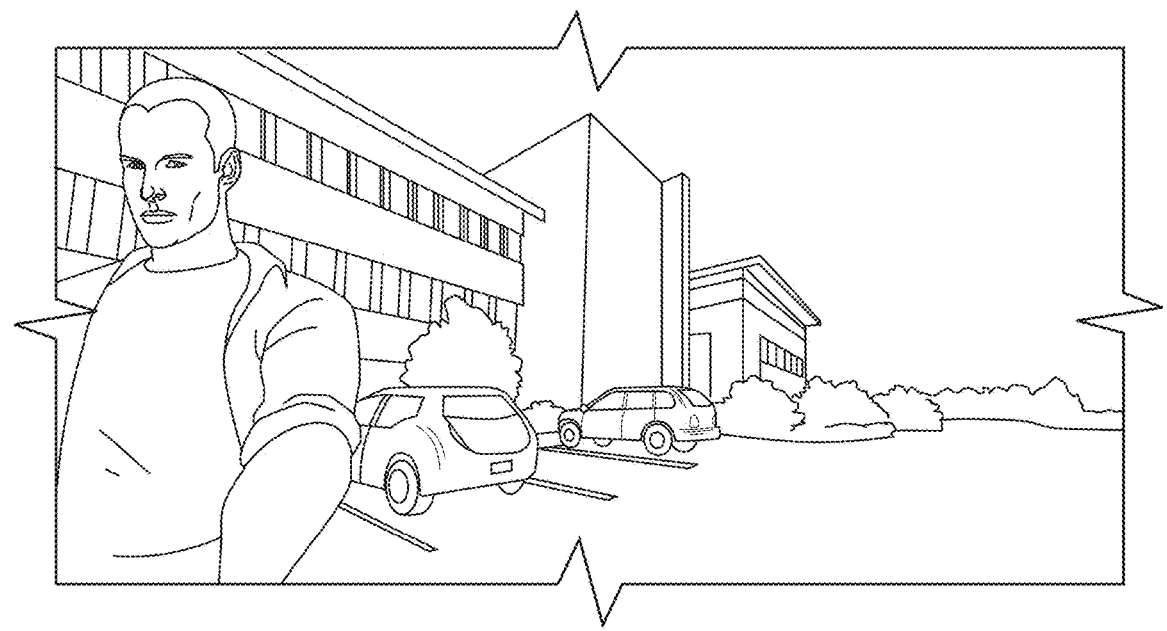
FIG. 1 is a graphical representation of an equilinear projection illustrating various distortions in accordance with the principles of the present disclosure.
Figure 2:
FIG. 2 is a graphical representation of the equilinear projection illustrating various distortions in accordance with the principles of the present disclosure.
Figure 5:
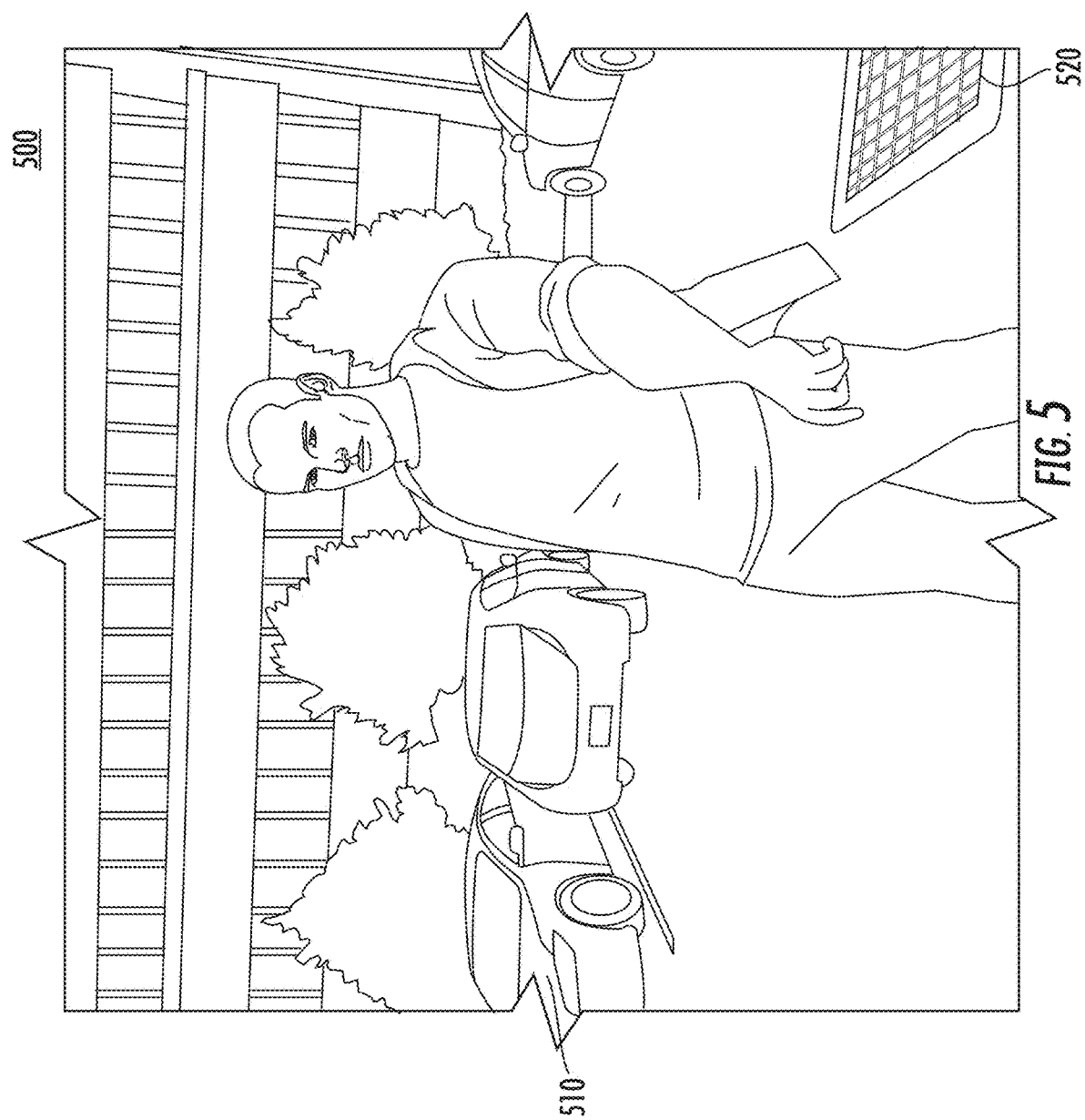
FIG. 5 is a sample image illustrating an equilinear projection in accordance with the principles of the present disclosure.
Figure 6:
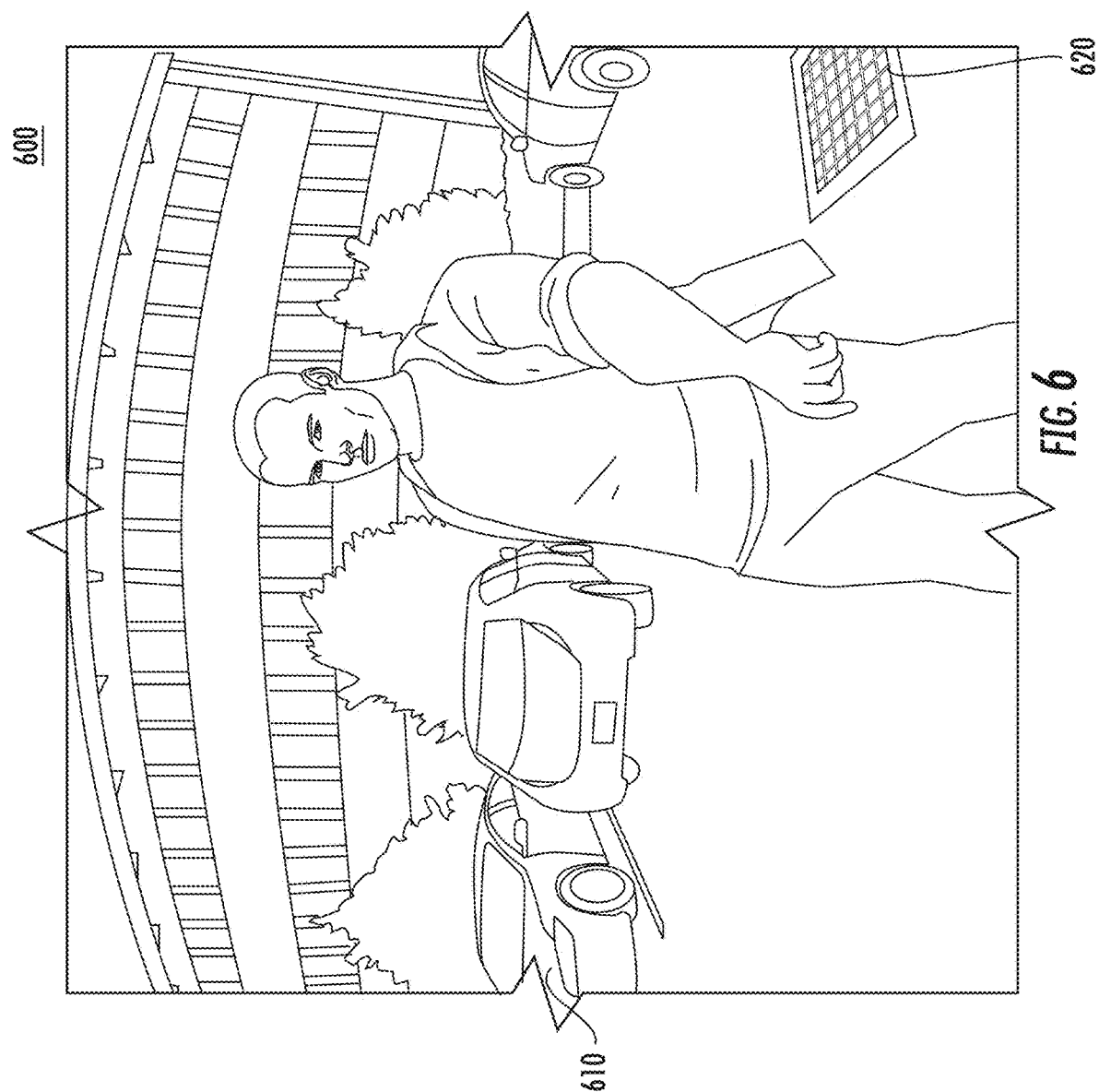
FIG. 6 is a sample image illustrating an exemplary RSV in accordance with some implementation of the present disclosure.

Referring now to FIG. 5, a prior art rectilinear projected viewport is illustrated, while in FIG. 6, the ERP projection methodologies described herein are utilized for the displayed viewport. It is readily apparent that the rectilinear projected viewport suffers from various image distortions at the edges of the viewport. In particular, note the distortions associated with the automobile 510 and storm drain 520. Contrast with the similar scene using the ERP projection methodologies described herein with respect to FIG. 6. In this image, the automobile 610 and the storm drain 620 are displayed with minimal distortion. Accordingly, when a user pans horizontally in image 500, objects on the edges of a given viewport will be distorted (see, for example, the face depicted in FIG. 1). However, using the RSV methodologies described herein (ERP in the depicted example), there are no changes in geometric distortion when a user pans horizontally, because the distance of the projected points from the virtual sphere (in the given ERP projection) does not change. It would be readily appreciated by one of ordinary skill that the principles described herein may be utilized for other latitudes other than a latitude (θ) of 0° (see discussion of FIGS. 4A and 4B supra).

RSV methodologies as described herein are not computationally intensive (e.g., in some embodiments require no interpolation) as any viewport that is centered around a given "equator" may be obtained from, for example, the ERP image by a simple pixel copy from the various RSV viewports stored in, for example, a server residing on a network. Moreover, the rotation transform is not computationally intensive (e.g., fast to compute) and may be readily available on extant graphics processing units (GPUs).

From an aesthetic viewpoint, the RSV methodologies described herein reduce geometric distortion when compared with typical FOV rectilinear projections (that are "flattened" for two-dimensional viewing). The typical FOV rectilinear projections have different perspective distances for each facet; i.e., the "virtual sphere" only touches the "centers" of a virtual cube, the edges of the cube have much farther perspective distances. In contrast, the perspective distance for ERP and spherical images are identical at the equator; in other words, the "virtual cylinder" nature of ERP perfectly touches the "virtual sphere" of a spherical image at the equator.

Even though RSV does not have any geometric distortion at the equator, RSV will suffer from "barrel distortion" effects at higher latitudes above the "equator". However, many users are already used to barrel distortion effects as a result of their prior viewing of captured images using, for example, so-called fisheye lenses. Additionally, these distortion effects are minimal for objects located at the equator (which is presumed to be where the point of interest for the image is). Accordingly, using the RSV methodologies described herein provides a better overall aesthetic experience, when compared with rectilinear viewport artifacts, especially for wider viewports (e.g., greater than 60°×60°).

Additionally, the RSV methodologies described herein provide for a consistent distortion for horizontal panning (whether or not these objects of interest reside on the true equatorial plane). Specifically, geometric distortion for an ERP is a function of latitudinal offset (not the longitudinal angle); thus objects of interest will experience the same distortion at higher latitudes throughout the horizontal panning. From a user experience point of view, this is preferable to the changing distortions that occur when a typical FOV rectilinear projection is dynamically panned.

Exemplary Apparatus—

Figure 7:
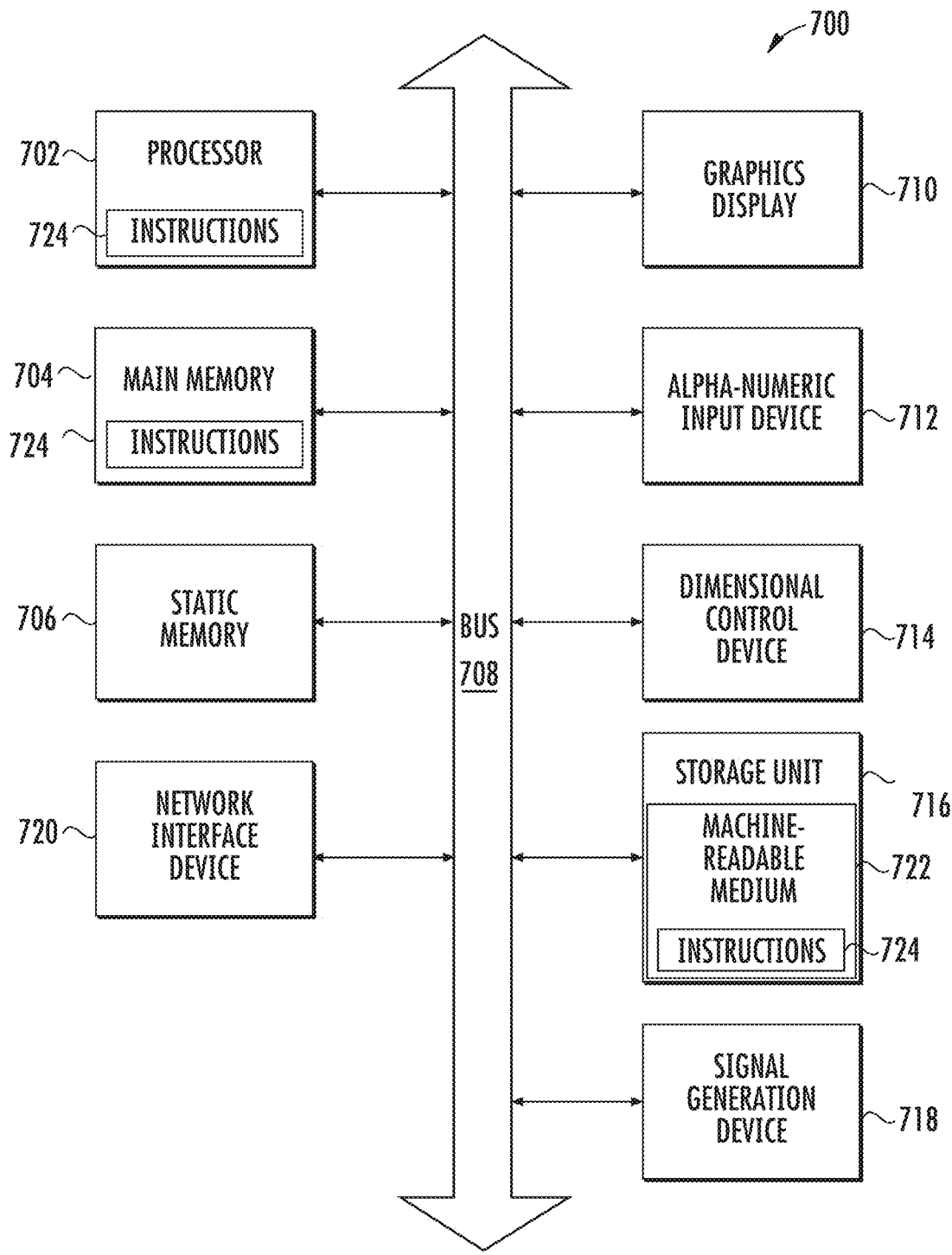
FIG. 7 is a block diagram of an exemplary implementation of a computing device, useful in performing the methodologies described herein.

FIG. 7 is a block diagram illustrating components of an example computing system able to read instructions from a computer-readable medium and execute them in one or more processors (or controllers). The computing system in FIG. 7 may represent an implementation of, for example, the video processing device for generating the RSVs described herein.

The computing system 700 can be used to execute instructions 724 (e.g., program code or software) for causing the computing system 700 to perform any one or more of the methodologies (or processes) described herein. In some implementations, one or more portions of the methodologies (or processes) described herein may be implemented using dedicated hardware or logic (e.g., an integrated circuit) which may, for example, be specifically adapted for use with (or used alternatively from), the aforementioned program code or software. Such implementations would be readily apparent to one of ordinary skill given the contents of the present disclosure.

In some embodiments, the computing system 700 operates as a standalone device or a connected (e.g., networked) device that connects to other computer systems. The computing system 700 may include, for example, a personal computer (PC), a tablet PC, a notebook computer, or other device capable of executing instructions 724 (sequential or otherwise) that specify actions to be taken. In another embodiment, the computing system 700 may include a server. In a networked deployment, the computing system 700 may operate in the capacity of a server or client in a server-client network environment, or as a peer device in a peer-to-peer (or distributed) network environment. Further, while only a single computer system 700 is illustrated, a plurality of computing systems 700 may operate to jointly execute instructions 724 to perform any one or more of the methodologies discussed herein.

The example computing system 700 includes one or more processing units (generally processor apparatus 702). The processor apparatus 702 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of the foregoing. The computing system 700 also includes a main memory 704. The computing system 700 may include a storage unit 716. The processor 702, memory 704 and the storage unit 716 may communicate via a bus 708.

In addition, the computing system 700 may include a static memory 706, a display driver 710 (e.g., to drive a plasma display panel (PDP), a liquid crystal display (LCD), or a projector). The computing system 700 may also include input/output devices, e.g., an alphanumeric input device 712 (e.g., touch screen-based keypad or an external input device such as a keyboard), a dimensional (e.g., 2-D or 3-D) control device 714 (e.g., a touch screen or external input device such as a mouse, a trackball, a joystick, a motion sensor, or other pointing instrument), a signal capture/generation device 718 (e.g., a speaker, camera, and/or microphone), and a network interface device 720, which also are configured to communicate via the bus 708.

Embodiments of the computing system 700 corresponding to a client device may include a different configuration than an embodiment of the computing system 700 corresponding to a server. For example, an embodiment corresponding to a server may include a larger storage unit 716, more memory 704, and a faster processor 702 but may lack the display driver 710, input device 712, and dimensional control device 714. An embodiment corresponding to an action camera may include a smaller storage unit 716, less memory 704, and a power efficient (and slower) processor 702 and may include multiple camera capture devices 718.

The storage unit 716 includes a computer-readable medium 711 on which is stored instructions 724 (e.g., software) embodying any one or more of the methodologies or functions described herein. The instructions 724 may also reside, completely or at least partially, within the main memory 704 or within the processor 702 (e.g., within a processor's cache memory) during execution thereof by the computing system 700, the main memory 704 and the processor 702 also constituting computer-readable media. The instructions 724 may be transmitted or received over a network via the network interface device 720.

While computer-readable medium 722 is shown in an example embodiment to be a single medium, the term "computer-readable medium" should be taken to include a single medium or multiple media (e.g., a centralized or distributed database, or associated caches and servers) able to store the instructions 724. The term "computer-readable medium" shall also be taken to include any medium that is capable of storing instructions 724 for execution by the computing system 700 and that cause the computing system 700 to perform, for example, one or more of the methodologies disclosed herein.

General Method—

Figure 8:
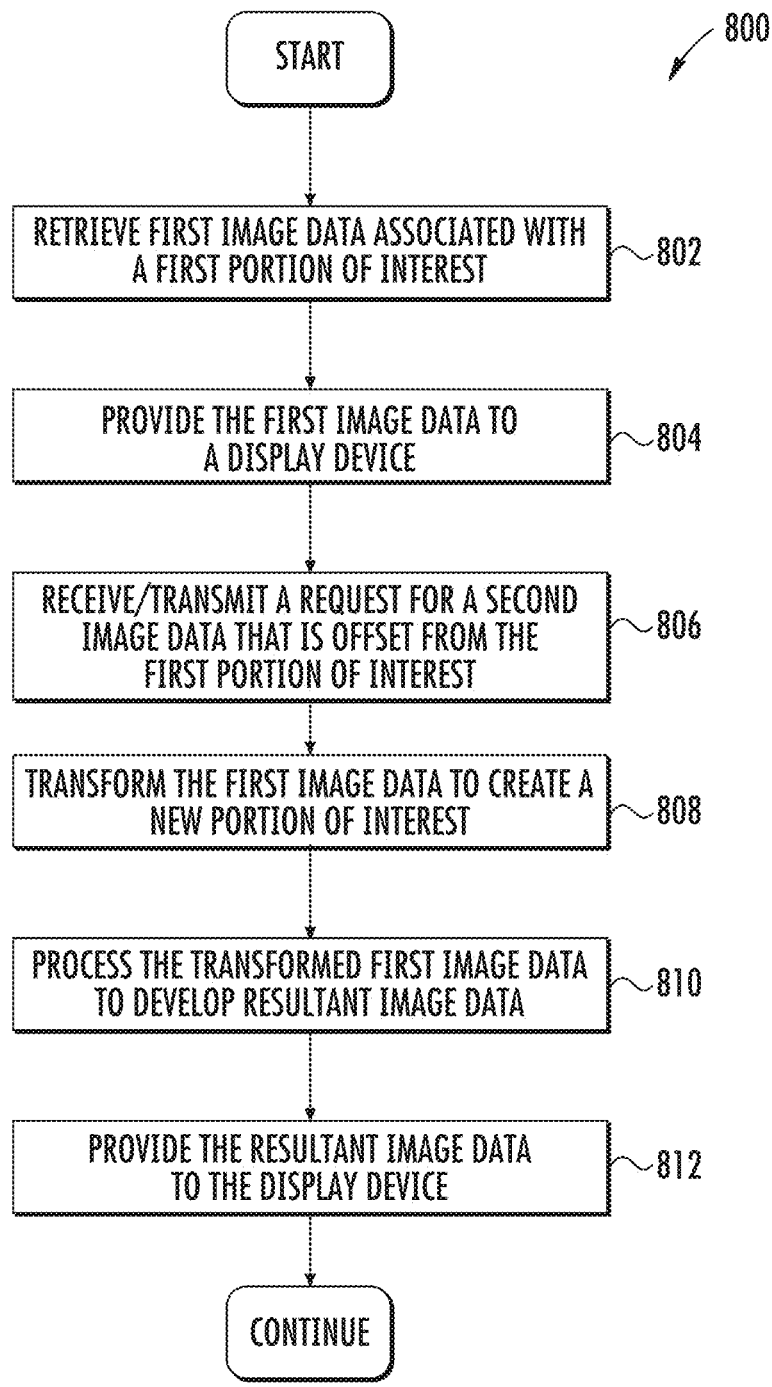
FIG. 8 is a logical flow diagram illustrating a generalized method for generating a rotated viewpoint, useful in performing the methodologies described herein.

FIG. 8 is a logical flow diagram illustrating a generalized method 800 for providing a RSV. While the present disclosure is presented within the context of rotating a source spherical image to generate a RSV, artisans of ordinary skill in the related arts will readily appreciate that the general principles provided herein may be applied to any number of source images such as RSP, cubic, octahedral, decahedral, dodecahedral, cylindrical, and/or any number of other source projections and/or output projections.

At step 802, first image data associated with a first portion of interest of source image data is retrieved. As a brief aside, source image data may take a number of different forms. For example, the source image data may include a static image or picture. Such static imagery may be desirable for immersing a user within a desired scene (such as adjacent a historical site as but one example). In some implementations, the source image data may include a video sequence of a scene or scenes. For example, the first portion of interest associated with a first portion of interest at steps 802, 804 may include image data associated with a first frame (or a first sequence of video frames) for the video sequence, while the second image data associated with the new portion of interest (steps 806, 808) may refer to a second frame (or a second sequence of video frames) for the video sequence.

In some implementations, a processor may retrieve first image data associated with an equatorial portion of the source image data. Here, the processor retrieves a viewport that is associated with a particular view angle (and equator) of source image data (e.g., source spherical image data). For example, the viewport may be rendered in an equirectangular projection (ERP) of the spherical image at the equator having a latitude of 0° and a longitudinal range of 120° (e.g., from +60° to −60°). As previously provided above, the retrieved viewport advantageously provides a viewport with minimal geometric distortion for a limited range of latitudinal view angles; at higher latitudes, the barrel distortion effects may increase.

While the foregoing embodiment is described with reference to an "equator" of a spherical projection, artisans of ordinary skill in the related arts will readily appreciate, given the contents of the present disclosure, that virtually any geometric characteristic may be substituted with equivalent success. For example, other embodiments may use a "meridian", or any of the other various latitudes or longitudes of a source spherical image. Still other embodiments, may use various hemispheres, poles, facets, intersices, or any number of other geometric characteristics to define the relevant portion of interest. Such an implementation may be dependent upon the rendered projection chosen so as to, for example, minimize distortion within the first portion of interest.

Additionally, while the foregoing embodiment describes a viewport that is bounded by a "view angle" in both latitudinal and longitudinal ranges, artisans of ordinary skill in the related arts will readily appreciate, given the contents of the present disclosure, that other characteristics of the field of view (FOV) may be used with equivalent success. Other implementations may use any number of display characteristics; e.g., resolution size, display shape, number of pixels, memory, display size. For example, the viewport may be 1080p image data that is extracted from a source spherical image data for use on a television format. Common examples of such display resolutions used for television include, without limitation, standard definition (SD, e.g., 480i), high definition (HD, e.g., 720p, 1080p, 1080i), 4K (e.g., 2160p), and 8K (e.g., 4320p).

While the various embodiments described herein have been described with reference to source image data that has otherwise been stitched together to form stitched photography or video, those of ordinary skill in the related arts will readily appreciate that the techniques used herein may be adapted with equal success to a variety of other applications in the virtual and augmented reality space. Common applications may include video gaming and 3D virtual imaging.

At step 804, the first image data is provided to a display device. In one exemplary embodiment, the processor provides the first image data to a network interface for transmission to a display device. In other embodiments, the processor provides the first image data to a local device bus for local display. Still other embodiments may receive and/or provide the data to another processor for rendering and/or display.

Common examples of display devices include personal media devices, smart phones, cameras, televisions, computer monitors, headmounted displays (HMD), and/or any number of other audio/visual (AV) equipment. For example, various embodiments of the present disclosure may find particular use within the emerging fields of virtual reality and/or augmented reality applications which provide immersive video environments in a 360° field of view (FOV) for use with HMD.

A request for a second image data that is offset from the first portion of interest of the first source image data is received at step 806. In one exemplary embodiment, the processor receives a request for second image data that is latitudinally offset from the equatorial portion of the first image data. As noted above, each viewport has minimal geometric distortion for a limited range of view angles; these correspond to the point(s) of interest of the image (e.g., the equator). The limited range of interest includes the point of interest and the ranges of the viewport that have acceptable geometric distortion. Ideally, the point of interest corresponds to the user's desired viewpoint (i.e., the user's desired view point is minimally distorted).

It is also appreciated (and expected) that the desired viewpoint may change during viewing. For example, a user may pan an image to the left or right, or up or down. The user's interest can be inferred from the user's desired viewpoint. During dynamically changing viewing, the range of interest for a particular projection may no longer match the user's desired viewpoint. When this occurs, the rendering device will need to refresh its viewport with the user's new desired viewpoint or a nearby viewport that has an acceptable amount of distortion.

Larger gaps between view angles may experience increasing amounts of geometric distortion. Thus, a user may experience more distortion when the viewport is less frequently refreshed. Accordingly, some variants may adjust the amount of offset so as to minimize the amount of geometric distortion between viewports. Other variants may maximize the offset, so as to accommodate other system limitations e.g., processor limitations and/or bandwidth may prevent more frequent viewport retrievals.

While the foregoing discussion is presented with respect to requested image data, artisans of ordinary skill in the related arts will readily appreciate, given the contents of the present disclosure, that other embodiments may not be based on requests. For example, in some variants viewports may be transmitted (e.g., pushed) instead of requested/received (e.g., pulled). Still other systems may transfer viewports at regular processing intervals, regardless of the amount of offset change.

Referring back to FIG. 8, at step 808, the first image data is transformed to create a new portion of interest from the first source image data. In one exemplary embodiment, the processor transforms image data in response to the received request for second image data such that the second image data resides on a new equatorial portion of the first image. Here, the transformation comprises a rotation of the source spherical image such that a latitudinal offset is set to be a new equator.

While the present disclosure describes rotation, other transforms may be used with equivalent success. Common examples of transformations that are well known in the related arts include without limitation: rotation, translation, inversion, mirroring, warping, distortion, linear mapping, and/or any number of other mathematical transformations. As previously noted, artisans of ordinary skill in the related arts will also appreciate, given the contents of the present disclosure, that virtually any geometric characteristic may be substituted for "equator" with equivalent success. For example, other embodiments may use a "meridian", or any of the various latitudes or longitudes of a spherical image. Still other embodiments, may use various hemispheres, poles, facets, intersices, or any number of other geometric characteristics to define the relevant portion of interest (in particular with respect to the desired display projection desired).

In some implementations, the new viewport need not be perfectly resolved. As previously noted, an ERP does experience barrel distortion effects for latitudes above and below the equator, thus horizontal panning may not be distorted, but vertical panning may result in some perceptible distortion. In some variants, the benefits of using a pre-stored viewport may outweigh the geometric distortion of the image quality. For example, a person that looks up at latitude 45° will have less barrel distortion with a pre-stored 30° tilted viewport as compared to the 0° non-tilted viewport, and the pre-stored 30° tilted viewport may be quickly retrieved with minimal computational overhead. Artisans of ordinary skill in the related arts will readily appreciate, given the contents of the present disclosure, that other tradeoffs may be made with equal success to accommodate e.g., bandwidth limitations, memory sizes, processor capabilities, power consumption, and/or any other practical considerations.

Thereafter, the transformed image data is processed at 810 to develop resultant image data. In one exemplary embodiment, the processing comprises conversion of the transformed image data into a new projection. In the described embodiments, the transformed spherical image data is used to generate a new viewport according to the ERP projection. Thereafter, the resultant image data is provided (e.g., transmitted) at step 812.

While the foregoing discussion is presented with respect to an ERP, other projections may be used with equivalent success. Common examples of such projections include, without limitation, RSP, cubemap, equal-area, octahedron, icosahedron, truncated square pyramid, and segmented sphere projections. Furthermore, such projections may be used to support a number of different field of views (FOV) and/or display characteristics; e.g., resolution size, display shape, number of pixels, memory, display size.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "computing device", includes, but is not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C #, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "camera" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A method for generating a rotated sphere viewpoint (RSV), comprising:

retrieving first image data associated with a first portion of interest of a source image, the source image comprising a spherical image, the first image data being associated with an equatorial portion;

receiving data relating to a request for second image data;

based on the received data relating to the request for the second image data, transforming the first image data, the transforming comprising algorithmically rotating the source image such that the second image data is associated with a new equatorial portion; and based on the transformed first image data, generating a second image associated with the second image data via conversion of the transformed first image data into an equirectangular projection (ERP) projection, and causing provision of the second image to a viewport, the ERP projection being disposed over the source image such that (i) prior to the transforming of the first image data, a surface of the ERP projection is collinear with the equatorial portion associated with the first image data, and (ii) subsequent to the transforming of the first image data, the surface of the ERP projection is collinear with the new equatorial portion.

2. The method of claim 1, wherein the generating of the second image comprises algorithmically converting the transformed first image data into an equirectangular projection (ERP) projection.

3. The method of claim 1, wherein the generating of the second image comprises generating an image with a distortion level of at least a portion of the first portion of interest that is less than a distortion level of a projection associated with the source image.

4. The method of claim 1, further comprising retrieving source image data, the source image data comprising at least data representative of a sequence of images, the sequence of images comprising the source image.

5. The method of claim 1, further comprising receiving the second image data, the second image data being associated with a second image that is offset latitudinally from the equatorial portion associated with a first image associated with the first image data.

6. The method of claim 1, wherein the transforming of the first image data comprises:

generating a virtual geometric structure; and determining a new portion of interest from the first image data;

wherein the new portion of interest resides on the new equatorial portion, the new equatorial portion residing on the generated virtual geometric structure.

7. A computerized apparatus configured to generate a rotated sphere viewpoint (RSV), the computerized apparatus being further configured to:

retrieve first image frame data relating to a first image frame associated with a first portion of interest, the first image frame data being obtained from source data, the source data comprising a spherical image;

receive data relating to a request for a second image frame associated with a second portion of interest, the second image frame being offset in at least one dimension with respect to an equatorial portion that is associated with the first image frame;

based on the received data relating to the request for the second image frame, transform the first image frame data via at least a rotation of the spherical image to produce a transformed image frame that resides on a new equatorial portion; and based on the transformed image frame, generate and cause provision of a second image frame, the generation of the second image frame comprising conversion of the transformed image frame into an equirectangular projection (ERP) projection;

wherein:

prior to the transformation of the first image frame, the ERP projection is disposed over the spherical image such that the equatorial portion associated with the first image frame is collinear with a surface of the ERP projection; and subsequent to the transformation of the first image frame, the ERP projection is disposed over the spherical image such that the new equatorial portion is collinear with the surface of the ERP projection.

8. The apparatus of claim 7, wherein:

the first portion of interest resides on the equatorial portion associated with the first image frame, and the second portion of interest resides on the new equatorial portion; and the transformed first image frame is reduced in at least a level of distortion associated with the first portion of interest.

9. The apparatus of claim 8, wherein the transformation of the first image frame further comprises a rotation of the spherical image associated with the first image frame.

10. The apparatus of claim 9, wherein the offset of the second image frame in at least one dimension comprises a latitudinal offset from the first portion of interest, the latitudinal offset being based on the rotation of the spherical image.

11. The apparatus of claim 7, wherein the source data comprises at least one video sequence.

12. The apparatus of claim 7, wherein:

the apparatus comprises a network interface configured to communicate with a display device; and the provision of the resultant image frame comprises provision of the resultant image frame to the display device.

13. A non-transitory computer-readable apparatus comprising a storage medium, the storage medium having a computer program stored thereon, the computer program comprising a plurality of instructions configured to, when executed by a processor apparatus, cause a computing device to:

retrieve first image data associated with a first portion of interest within a source image, the source image comprising a spherical image, the first image data being associated with a first equatorial portion;

based at least on data relating to a different portion of interest than the first portion, transform the first image data via at least a rotation of the source image such that the different portion of interest resides on a second equatorial portion different than the first equatorial portion; and using at least the transformed first image data, generate resultant image data corresponding to the different portion of interest via at least conversion of the transformed first image data into an equirectangular projection (ERP) projection, and provide the resultant image data to a viewport;

wherein, prior to the transformation of the first image data, the ERP projection is configured such that a surface of the ERP projection is collinear with the first equatorial portion associated with the first image frame; and wherein, subsequent to the transformation of the first image frame, the ERP projection is configured such that the surface of the ERP projection is collinear with the second equatorial portion.

14. The non-transitory computer-readable apparatus of claim 13, wherein the transformation of the first image data comprises rotation of the source image.

15. The non-transitory computer-readable apparatus of claim 13, wherein the generation of the resultant image data comprises conversion of the transformed first image data into an equirectangular projection (ERP) projection.

16. The non-transitory computer-readable apparatus of claim 13, wherein:
the first portion of interest resides on the first equatorial portion, and the different portion of interest resides on the second equatorial portion;
the different portion includes at least some of the first image data; and
the transformation of the first image data comprises a reduction of at least a level of distortion associated with the first portion of interest.

17. The non-transitory computer-readable apparatus of claim 13, wherein:
the provision of the resultant image data to the viewport comprises enablement of a render of the ERP projection on the viewport; and
the rendered ERP projection is associated with a view angle, the view angle comprising a latitudinal angle and a range of longitudinal angles.

* * * * *